United States Patent [19]
Orth

[11] Patent Number: 4,649,631
[45] Date of Patent: Mar. 17, 1987

[54] DEVICE FOR ENABLING THE CHANGEOVER OF A ROLLER SHELL OR CASING

[75] Inventor: Herbert Orth, Hanover, Fed. Rep. of Germany

[73] Assignee: Hermann Berstorff Maschinenbau GmbH, Hanover, Fed. Rep. of Germany

[21] Appl. No.: 829,076

[22] Filed: Feb. 13, 1986

[30] Foreign Application Priority Data

Feb. 23, 1985 [DE] Fed. Rep. of Germany ....... 3506423

[51] Int. Cl.4 .................. B23P 19/00; B23P 15/26
[52] U.S. Cl. .................................. 29/700; 29/110; 29/726; 29/426.5
[58] Field of Search ............... 29/110, 402.08, 402.03, 29/700, 724, 791, 726, 426.1, 426.5

[56] References Cited

U.S. PATENT DOCUMENTS

| | | | |
|---|---|---|---|
| 3,289,282 | 12/1966 | Shaffer | 29/700 |
| 3,507,028 | 4/1970 | Stellatella | 29/726 |
| 3,911,550 | 10/1975 | Gilman | 29/426.1 |
| 4,215,459 | 8/1980 | Kifor | 29/426.1 |
| 4,295,260 | 10/1981 | Divers | 29/426.5 |
| 4,355,450 | 10/1982 | Miller | 29/426.5 |

Primary Examiner—Howard N. Goldberg
Assistant Examiner—Irene Graves Golabi
Attorney, Agent, or Firm—Schwartz, Jeffery, Schwaab, Mack, Blumenthal & Evans

[57] ABSTRACT

A device for enabling the changeover of the shell or casing or a roller in a calender, the ends of the roller being journalled to rotate in bearings, means being provided for retaining the journal at one end in a desired position while the bearing body surrounding the roller bearing at the other end is removed. A yoke-shaped hinged support member is provided with means for removing the bearing body and is pivotally mounted at one of its ends so as to be pivotable into a position, after the bearing body has been removed to reveal the free annular space around the roller bearing through which the roller casing can be removed and interchanged.

4 Claims, 3 Drawing Figures

DEVICE FOR ENABLING THE CHANGEOVER OF A ROLLER SHELL OR CASING

FIELD OF THE INVENTION

The present invention relates to a device for enabling the changeover of a roller shell or casing which is primarily intended for use in calenders. The calenders themselves may be used for producing embossed thermoplastics material films or for producing profile strips from rubber or elastomeric materials for use in the tyre-manufacturing industry. Such a calender includes two or more rollers mounted in a support column, at least one of which rollers has an interchangeable and profiled shell or casing disposed around a roller core.

BACKGROUND OF THE INVENTION AND PRIOR ART DISCUSSION

In German Offenlegungsschrift No. 2606545, there is disclosed a changeover device which includes means for removing and/or installing the roller shell and a centering device which centers the roller journal during the changeover operation. This centering device includes a conical head portion which engages in a conically shaped recess.

In such an arrangement, the changeover device is moved, by means of a crane, along the end face of the roller which is provided with the shell or casing to be replaced. Thereafter, a tubular extension portion, which is provided with a disc member which closes one end face thereof and against which a conically-shaped component is retained by means of an electromagnet, is moved into a corresponding conical-shaped recess. A screw-threaded spindle is then screwed into a threaded bore formed in the roller shell casing to be interchanged, and the screw-threaded spindle is connected to a means for entraining the piston of a hydraulic piston and cylinder arrangement.

By actuating the hydraulic piston and cylinder arrangement, the shell or casing is removed from the roller core and subsequently replaced by another casing by reversing the above-described sequence of steps.

Such a known device permits small, lightweight roller shells or casings to be interchanged. However, it is extremely difficult to remove the bearing body for the roller prior to the removal of the roller shell or casing over the roller bearing remaining on the roller journal. This is particularly true in large calenders which have large and heavy bearing bodies. This is because extensive damage is caused even by slight tilting of the bearing arrangements.

Profile manufacturers in, for example, the tyre-manufacturing industry, demand that the profiled roller shell or casing must be interchangeable within the space of a few minutes. It is particularly important that no tilting forces whatsoever should act on the bearing body during the changeover operation because the component parts thereof would almost certainly be damaged and need to be replaced. This, in turn, would cause the changeover process to be considerably extended, with the result that the calendering plant will be idle for a length period of time.

OBJECT OF THE INVENTION

The present invention seeks to provide a roller shell or casing changeover device primarily for profile calenders which permits the shell or casing to be changed very accurately and rapidly, even if the profile calender is large and has heavy bearings.

SUMMARY OF THE INVENTION

According to the present invention, there is provided a device for enabling the changeover of a roller shell or casing in a calender comprising a plurality of rollers disposed in a support column, at least one of the rollers comprising an interchangeable, profiled shell or casing disposed on a roller core, wherein the roller core is mounted on a shaft journalled at each end to rotate in bearings, the enabling device comprising a retaining device for retaining the journal at one of the ends in a desired position during the changeover of the shell or casing, the bearing receiving the other end of the shaft being a roller bearing surrounded by a bearing body connected to a yoke-shaped hinged member normally located adjacent the end face of the roller provided with the interchangeable shell or casing, a centering device for centering the yoke-shaped support member on the roller core, a pressure piston and cylinder arrangement for actuating the centering device, hydraulic piston and cylinder arrangements mounted on the yoke-shaped hinged support member, the piston rods of the hydraulic piston and cylinder arrangements being affixed to the bearing body of the roller bearing to permit removal thereof, locking means for detachably locking one end of the yoke-shaped member onto the calender support column, the other end of the yoke-shaped support member being pivotably mounted about a pivot point on the calender support column whereby the yoke-shaped support member is pivotable, after removal of the roller bearing body from the roller bearing, into a position in which an annular opening is defined around the roller bearing through which the roller shell or casing is removable.

By locating the yoke-shaped hinged support member opposed to one end face of the roller having the shell or casing to be interchanged, an annular bearing body may be removed from the roller bearing in which the roller shaft is journalled in a very simple and reliable manner. This is effected subsequent to the roller core and the roller bearing itself having previously been accurately centred and fixed in a very stable manner.

The device of the present invention eliminates any possibility of the bearing body tilting. After the bearing body has been removed from the roller bearing, the roller shell or casing can be stripped from the roller core by a deflector or stripper plate actuated by a hydraulic piston and cylinder arrangement. The plate is caused to enter an annular groove formed in the roller shell or casing. The shell or casing is then pushed through the annular space from which the bearing body has been previously removed.

Before the casing is removed, the locking of one end of the yoke-shaped hinged support member on the support column must be removed and the support member pivoted away from the end face of the roller.

Advantageously, pivotal movement of the yoke-shaped support member about the pivot point is effected by means of a hydraulic rotary cylinder.

Desirably, the locking means for locking the yoke-shaped support member on the support column is a hydraulically actuatable ball lock. The ball lock may comprise a ball which is attached to the hinged support member and which, for locking purposes, is driven into a semi-circular recess formed in the calender support column. The ball is locked in position by means of a wedge-shaped member which is hydraulically moved therebeneath.

Preferably, the centering device comprises a cylindrical component which engages in a correspondingly shaped hollow-cylindrical recess, one of the component and the recess being formed in the roller core. The cylindrical configuration makes it easier for these component parts to be released or detached. A conical configuration, for example, would produce increased frictional forces and a release or detachment operation would be substantially more difficult to effect.

The device according to the invention permits the entire operation for changing the profile roller shell casing to be effected extremely quickly.

BRIEF DESCRIPTION OF THE DRAWINGS

One embodiment of the present invention will be further described, by way of example, with reference to the accompanying drawings, in which.

DESCRIPTION OF PREFERRED EMBODIMENT

Figure 1:
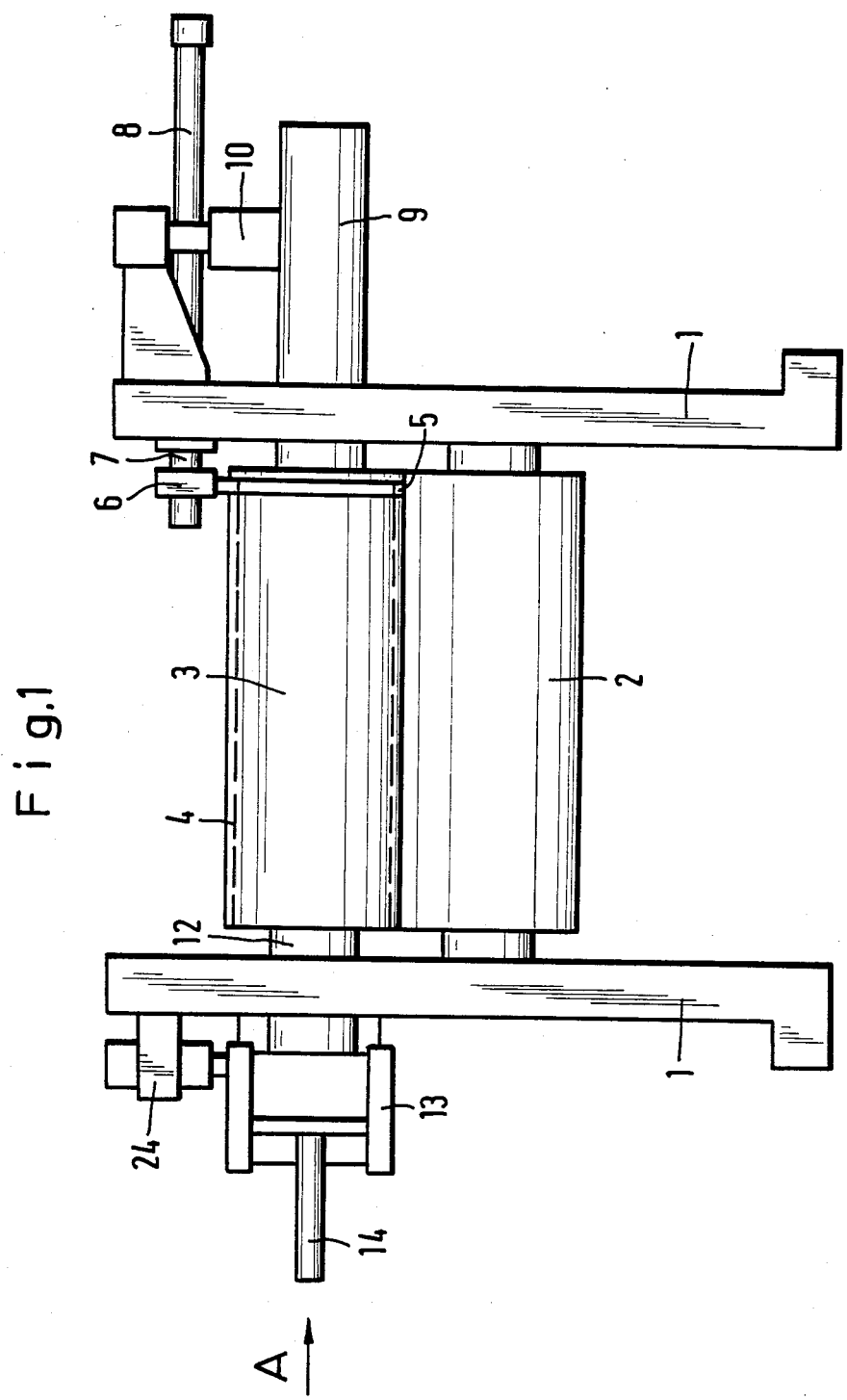
FIG. 1 is a longitudinal sectional view through a profile calender arrangement including a device for enabling the changeover of the roller shell in accordance with the present invention.

In FIG. 1, there is shown a profile calender which includes a calender support column 1. Mounted in the column 1 are rollers 2 and 3 of which the upper roller 3 is profiled roller having an interchangeable shell or casing 4.

In one end region of the roller casing or shell 4, an annular groove 5 is provided in which a deflector plate 6 engages. The deflector plate 6 is mounted on shafts 7. The shafts 7 are displaceable through the calender support by means of a hydraulic piston and cylinder arrangement 8, which arrangement 8 is disposed externally of the support column 1.

The roller 3, having the shell or casing 4 to be interchanged, has two opposed journals 9 and 12. The journal 12 rotates in a hinged bearing assembly. The assembly includes a bearing 21 mounted in a bearing body 11, which latter, as will be described hereinafter, is removed together with the roller shell 4 when the latter is being interchanged. This removal would normally permit the journal 12 to pivot. However, this is undesirable and, accordingly, a hold-down member 10 is provided to act on the journal 9 to prevent such pivotal movement.

Figure 2:
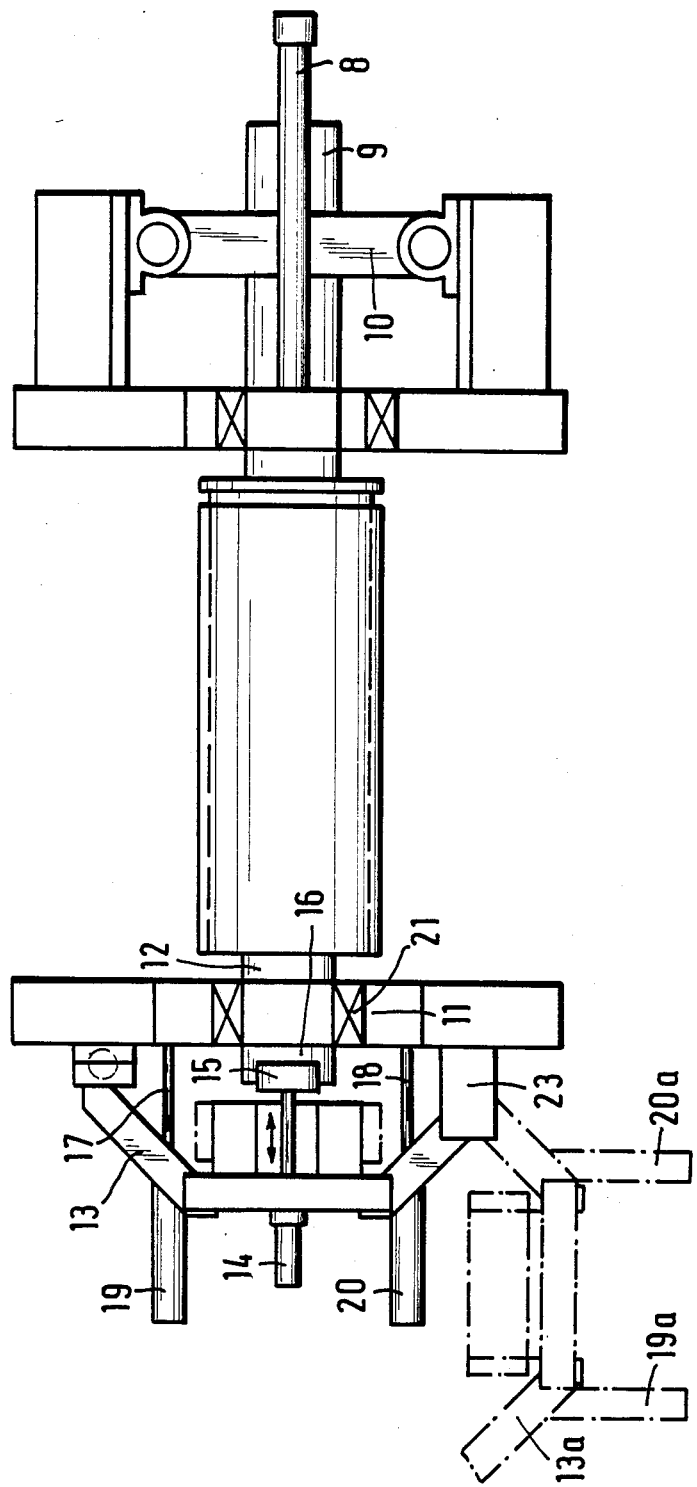
FIG. 2 is a plan view of the arrangement shown in FIG. 1.

Further details of the roller shell changing device are shown more clearly in FIG. 2. The bearing assembly further includes a centering pressure piston and cylinder arrangement 14 which is disposed in a yoke-shaped hinged member 13. A cylindrical member 15 is secured to the piston rod of the centering pressure cylinder and engages in a correspondingly shaped cylindrical recess 16 formed in the core of the profile roller 3. The piston rods 17 and 18 of two hydraulic piston and cylinder arrangements 19 and 20 are secured to the bearing body 11 so that the bearing body 11 can be removed from the bearing 21.

Figure 3:
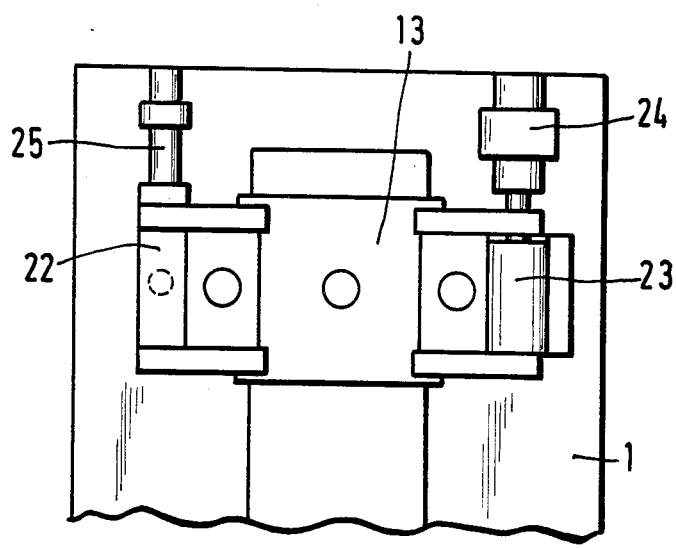
FIG. 3 is a partial front view taken in the direction of arrow A in FIG. 1.

As shown in FIG. 3, the yoke-shaped hinged member 13 is lockable in position by means of a locking member 22 and is pivotable about a pivot 23. The locking means comprises a ball (not shown) which is secured to the yoke-shaped hinged member 13. The ball engages in a substantially semi-circular recess formed in the support column 1 and is locked in this position by means of a wedge-shaped locking member which is moved therebeneath by means of a hydraulic piston and cylinder arrangement 25. Conversely, the ball is released by raising the wedge-shaped member.

The pivotal movement of the member 13 is effected by actuating the hydraulic rotary motor 24. The position into which the member 13 is pivoted is shown in dash-dotted lines, the reference numerals 13a, 19a and 20a indicating the positions of the hinged member 13 and the hydraulic piston and cylinder arrangements 19 and 20 respectively.

The manner in which a roller shell or casing 4 is changed will now be described. However, before doing so, mention should be made of the fact that the new roller shell or casing is preheated to, for example, the working temperature of the profile calender in an autoclave (not shown) before such change-over is effected.

The profile roller 3 having the shell 4 which is to be changed is initially moved into a changeover position by means of adjusting devices (not shown). The hold-down member 10 is then moved by a hydraulic arrangement onto the roller journal 9 to prevent the journal 12 from sinking once the bearing body 11 is removed. As shown, the member 10 supports the journal 9 in, effectively, a cantilever manner. Subsequently, the centering piston and cylinder arrangement 14 is actuated so that the cylindrical component 15 secured to the piston rod of the arrangement enters the recess 16 formed in the profile roller core.

The hydraulic piston and cylinder arrangements 19 and 20 are then actuated. The piston rods 17 and 18 of these arrangements are secured to the bearing body 11 and hence retraction of the rods 17 and 18 will cause the bearing body 11 to be removed from the bearing 21. Accordingly, a free annular space is produced around the bearing 21 which permits the passage of the roller shell or casing 4 therethrough. After removal of the bearing body 11, the cylindrical member 15 is extracted from the recess 16 by re-actuation of the centering cylinder 14.

The locking member 22 is then unlocked by means of the hydraulic piston and cylinder arrangement 25 shown in FIG. 3. By actuation of the pivot motor 24, the unlocked yoke-shaped support 13 is pivoted about the pivotal point 23 into the position shown in dash-dotted lines in FIG. 2 to such an extent that the roller casing 4 can be removed therepast in an unhindered manner. Subsequently, a lifting apparatus or hoist (not shown) mounted on a carriage is moved to the location of the roller shell or casing to remove it.

A mechanical locking member (not shown) between the profile shell or casing 4 and the profile roller core is then released, and the deflector plate 6 engages in the annular groove 5 formed in the shell or casing 4. The casing 4 is then pressed downwardly by means of the displacement hydraulic piston and cylinder arrangement 8, pushed onto the hoist (not shown) as far as a stop member and then locked in position. The hoist and the shell or casing are then moved into a conveying position.

The new profile roller shell or casing is then conveyed from the pre-heating apparatus to the calender by means of the hoist and pushed onto the roller core. The above-described sequence of steps is reversed, and the new roller shell or casing is locked in position on the core. It is now possible for another profile formed from rubber or a similar material to be produced by the calender.

I claim:

1. A device for enabling a changeover of a roller shell or casing in a calender comprising a support column and a plurality of rollers rotatably mounted in said support column, at least one of said rollers comprising a roller core, an interchangeable, profiled shell or casing disposed around said roller core, said shell or casing having opposed first and second end regions, shaft means mounting said roller core, said shaft comprising opposed first and second end regions defining first and second journal means and first and second bearing means rotatably receiving, respectively, said first and second journal means said enabling means comprising:

retaining means for retaining said first journal means in a desired position during the changeover of said shell or casing, said second bearing means comprising a roller bearing and bearing body means surrounding said roller bearing, a yoke-shaped hinged support member connectable to said bearing body means and normally located adjacent said bearing body means and said second end of said roller provided with said interchangeable shell or casing;

a centering device for centering said yoke-shaped support member and said roller core with respect to one another, a pressure piston and cylinder arrangement for actuating said centering device, hydraulic piston and cylinder arrangements mounted on said yoke-shaped hinged support member, said arrangements each including a piston rod, said piston rods of said cylindrical piston and cylinder arrangements being detachably affixed to said bearing body of said roller bearing to permit removal thereof, said yoke-shaped hinged support member including opposed first and second ends, locking means for detachably locking said first end of said yoke-shaped member onto said calender support column and pivot mounting means on said calender support column defining a pivot point and mounting said second end of said yoke-shaped support member, whereby said yoke-shaped support member is pivotable, after removal of said roller bearing body from said roller bearing, into a position in which the annular opening around said roller bearing produced by said removal is freely accessible, thereby permitting removal of said roller shell or casing.

2. A device as recited in claim 1, additionally comprising actuating means for causing said pivotal movement of said yoke-shaped support member about said pivot point, said actuating means comprising a hydraulic rotary cylinder operatively connected to said yoke-shaped support member.

3. A device as recited in claim 1, wherein said locking means for locking said yoke-shaped support member on said support column comprises a ball lock and hydraulic means for actuating said ball lock.

4. A device as recited in claim 1 wherein said centering device comprises a cylindrical component and a correspondingly shaped hollow-cylindrical recess for receiving said cylindrical component, one of said component and the recess being formed in said roller core.

* * * * *